(12) United States Patent
Mugeraya et al.

(10) Patent No.: US 12,162,610 B2
(45) Date of Patent: Dec. 10, 2024

(54) READINESS INDICATOR LIGHT SYSTEM FOR EVACUATION SLIDE

(71) Applicant: GOODRICH CORPORATION, Charlotte, NC (US)

(72) Inventors: Bhavik Mugeraya, Bangalore (IN); Priyank Anavadiya, Bangalore (IN); Apoorva Bajpai, Kanpura (IN)

(73) Assignee: GOODRICH CORPORATION, Charlotte, NC (US)

( * ) Notice: Subject to any disclaimer, the term of this patent is extended or adjusted under 35 U.S.C. 154(b) by 272 days.

(21) Appl. No.: 17/829,047

(22) Filed: May 31, 2022

(65) Prior Publication Data

US 2023/0097188 A1    Mar. 30, 2023

(30) Foreign Application Priority Data

Sep. 24, 2021    (IN) .............................. 202141043347

(51) Int. Cl.
*B64D 25/14*    (2006.01)
*B64D 47/02*    (2006.01)

(52) U.S. Cl.
CPC ............. *B64D 25/14* (2013.01); *B64D 47/02* (2013.01)

(58) Field of Classification Search
CPC .................................................... B64D 25/14
See application file for complete search history.

(56) References Cited

U.S. PATENT DOCUMENTS

| | | | |
|---|---|---|---|
| 9,309,002 B2 | 4/2016 | Fellmann et al. | |
| 10,322,812 B2* | 6/2019 | Knijnenburg | .......... B64D 45/00 |
| 10,351,251 B2 | 7/2019 | Haynes et al. | |
| 2005/0115794 A1* | 6/2005 | Zonneveld | ............. B64D 25/14 |
| | | | 182/48 |
| 2015/0097083 A1 | 4/2015 | Fellmann et al. | |
| 2018/0170559 A1* | 6/2018 | Haynes | ................... B64D 45/00 |
| 2019/0257710 A1 | 8/2019 | Fages et al. | |
| 2020/0262580 A1* | 8/2020 | Palaniappan | .......... B64D 25/14 |
| 2021/0086870 A1* | 3/2021 | Haynes | ................... B63B 7/085 |
| 2021/0147090 A1 | 5/2021 | Jurlina et al. | |
| 2021/0221523 A1 | 7/2021 | Haynes et al. | |
| 2021/0221525 A1* | 7/2021 | Haynes | ................... B64D 45/00 |
| 2021/0354835 A1* | 11/2021 | John | ....................... F16K 17/32 |

OTHER PUBLICATIONS

European Patent Office, European Search Report dated Feb. 14, 2023 in Application No. 22197802.6.
European Patent Office, European Office Action dated Aug. 8, 2024 in Application No. 22197802.6.

* cited by examiner

*Primary Examiner* — Alexander K Garlen
(74) *Attorney, Agent, or Firm* — SNELL & WILMER L.L.P.

(57) ABSTRACT

An evacuation slide light system may comprise a sensor, a controller configured to receive a signal from the sensor, and a plurality of lights operably coupled to the controller. The sensor may be configured to measure at least one of a pressure of the evacuation slide or a stretch of a material of the evacuation slide. The controller may determine the pressure of the evacuation slide based on the signal from the sensor. The controller may be configured to cause the plurality of lights to emit a first color if the pressure of the evacuation slide is less than a threshold pressure and to emit a second color if the pressure of the evacuation slide is greater than or equal to the threshold pressure.

8 Claims, 13 Drawing Sheets

READINESS INDICATOR LIGHT SYSTEM FOR EVACUATION SLIDE

CROSS-REFERENCE TO RELATED APPLICATIONS

This application claims priority to, and the benefit of, India Patent Application No. 202141043347, filed Sep. 24, 2021 (DAS Code 3B3B) and titled "READINESS INDICATOR LIGHT SYSTEM FOR EVACUATION SLIDE," which is incorporated by reference herein in its entirety for all purposes.

FIELD

The present disclosure relates to aircraft evacuation systems and, in particular, to an evacuation slide light system that indicates an inflation status of the evacuation slide.

BACKGROUND

Emergency evacuation systems, including inflatable evacuation slides, may be used to exit an aircraft in the absence of a jet way or other suitable means of egress for passengers. The evacuation slides may deploy, for example, from the side of an aircraft fuselage. Evacuation systems may include a readiness indicator, which indicates to evacuees whether the slide is fully deployed and/or in a position to safely covey evacuees to an exit surface. Current readiness indicators may inflate during slide inflation. However, the indicators can be difficult to see and/or understand and may be less effective in high winds.

SUMMARY

An evacuation slide light system is disclosed herein. In accordance with various embodiments, the evacuation slide light system may comprise a sensor, a controller configured to receive a signal from the sensor, and a plurality of lights operably coupled to the controller. The sensor is configured to measure at least one of a pressure of an evacuation slide or a stretch of a material of the evacuation slide. The controller is configured to determine the pressure of the evacuation slide based on the signal from the sensor. The controller is configured to cause the plurality of lights to emit a first color if the pressure of the evacuation slide is less than a threshold pressure and to emit a second color if the pressure of the evacuation slide is greater than or equal to the threshold pressure.

In various embodiments, the controller may be configured to monitor the pressure of the evacuation slide using the signal received from the sensor. The controller may be configured to cause a color emitted by the plurality of lights to change from the second color to the first color if, based on the signal received from the sensor, the controller determines the pressure of the evacuation slide has decreased to below the threshold pressure.

In various embodiments, the controller may be configured to compare the pressure of the evacuation slide to a raft threshold pressure. The controller may be configured to cause the plurality of lights to begin flashing in response to determining the pressure of the evacuation slide is less than the raft threshold pressure.

In various embodiments, the controller may be configured to receive an initial deployment signal in response to the evacuation slide being deployed. The controller may be configured to cause the plurality of lights to begin flashing in response to determining the pressure of the evacuation slide has not reached the threshold pressure within a threshold duration of time after receiving the initial deployment signal.

In various embodiments, the controller may be configured to control a flashing speed of the plurality of lights based on the signal from the sensor. In various embodiments, the controller may be configured to cause the flashing speed of the plurality of lights to decrease as the pressure of the evacuation slide approaches the threshold pressure.

In various embodiments, the controller may be configured to receive power from an aircraft power supply.

An article of manufacture including a tangible, non-transitory computer-readable storage medium is also disclosed herein. In accordance with various embodiments, the tangible, non-transitory computer-readable storage medium has instructions stored thereon for controlling an evacuation slide light system. The instructions, in response to execution by a controller, cause the controller to perform operations, which may comprise receiving, by the controller, a signal from a sensor operably coupled to an evacuation slide; determining, by the controller, a pressure of the evacuation slide based on the signal from the sensor; determining, by the controller, a desired illumination color for a plurality of lights based on the pressure of the evacuation slide; and sending, by the controller, an illumination command to the plurality of lights. The illumination command is configured to cause the plurality of lights to emit the desired illumination color.

In various embodiments, determining, by the controller, the desired illumination color for the plurality of lights comprises comparing, by the controller, the pressure of the evacuation slide to a threshold pressure.

In various embodiments, the illumination command is configured to cause the plurality of lights to emit a first color if the pressure of the evacuation slide is less than the threshold pressure and to emit a second color if the pressure of the evacuation slide is greater than or equal than the threshold pressure.

In various embodiments, the operations may further comprise comparing, by the controller, the pressure of the evacuation slide to a raft threshold pressure; and commanding, by the controller, the plurality of lights to flash if the pressure of the evacuation slide is less than the raft threshold pressure.

In various embodiments, the operations may further comprise receiving, by the controller, an initial deployment signal; commanding, by the controller, the plurality of lights to emit a first color in response to receiving the initial deployment signal; determining, by the controller, whether the pressure of the evacuation slide is equal to or greater than a threshold pressure at a preselected duration of time after receipt of the initial deployment signal; and commanding, by the controller, the plurality of lights to flash if at the preselected duration of time after receipt of the initial deployment signal the pressure of the evacuation slide is less than the threshold pressure.

In various embodiments, the operations may further comprise changing, by the controller, a flashing speed of the plurality of lights based on the pressure of the evacuation slide. In various embodiments, the sensor may be configured to measure a stretch of a material of the evacuation slide.

An evacuation slide is also disclosed herein. In accordance with various embodiments, the evacuation slide may comprise an inflatable rail structure and an evacuation slide light system coupled to the inflatable rail structure. The evacuation slide light system may include a switch, a lanyard coupled to the inflatable rail structure and configured to translate the switch between a first state and a second state, a controller operably coupled to the switch, and a plurality of lights operably coupled to the controller. The controller may be configured to determine whether the switch is in the first state or the second state. The controller may be configured to cause the plurality of lights to emit a first color in response to determining the switch is in the first state, and to cause the plurality of lights to emit a second color in response to determining the switch is in the second state.

In various embodiments, the lanyard may be coupled to a toe end of the evacuation slide. In various embodiments, in the first state, the lanyard is coupled to the switch, and in the second state, the lanyard is separated from the switch.

In various embodiments, the controller may be configured to receive an initial deployment signal in response to the evacuation slide being deployed. The controller may be configured to cause the plurality of lights to begin flashing if the switch does not translate to the second state within a threshold duration of time after receipt of the initial deployment signal.

In various embodiments, upon receiving the initial deployment signal, the controller may cause the plurality of lights to emit the first color. In various embodiments, the controller may be configured to receive power from an aircraft power supply.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full, and/or any other possible attachment option.

Throughout the present disclosure, like reference numbers denote like elements. Accordingly, elements with like element numbering may be shown in the figures but may not necessarily be repeated herein for the sake of clarity.

Figure 1:
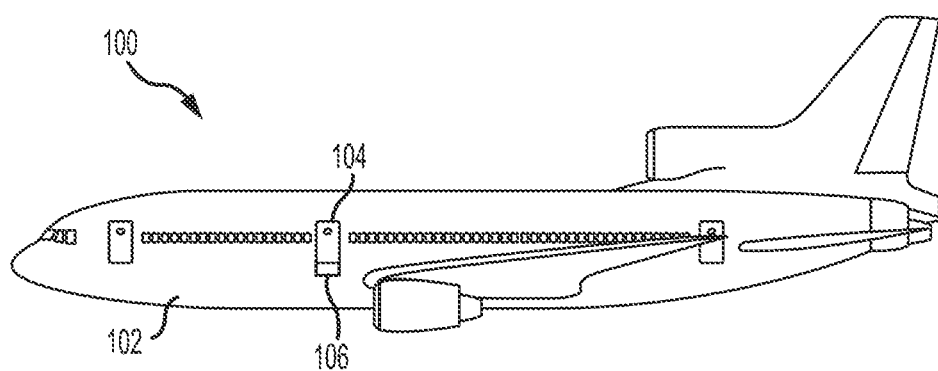
FIG. 1 illustrates an aircraft having an evacuation system, in accordance with various embodiments.

With reference to FIG. 1, an exemplary aircraft 100 is shown, in accordance with various embodiments. Aircraft 100 may comprise a fuselage 102 having plurality of exit doors, including an exit door 104. Aircraft 100 may include one or more evacuation assemblies positioned near a corresponding exit door. For example, aircraft 100 includes an evacuation assembly 106 positioned near exit door 104. In the event of an emergency, exit door 104 may be opened by a passenger or crew member of aircraft 100. Evacuation assembly 106 may deploy in response to exit door 104 being opened or in response to another action taken by a passenger or crew member, such as, for example depression of a button, actuation of a lever, or similar action.

Figure 2A:
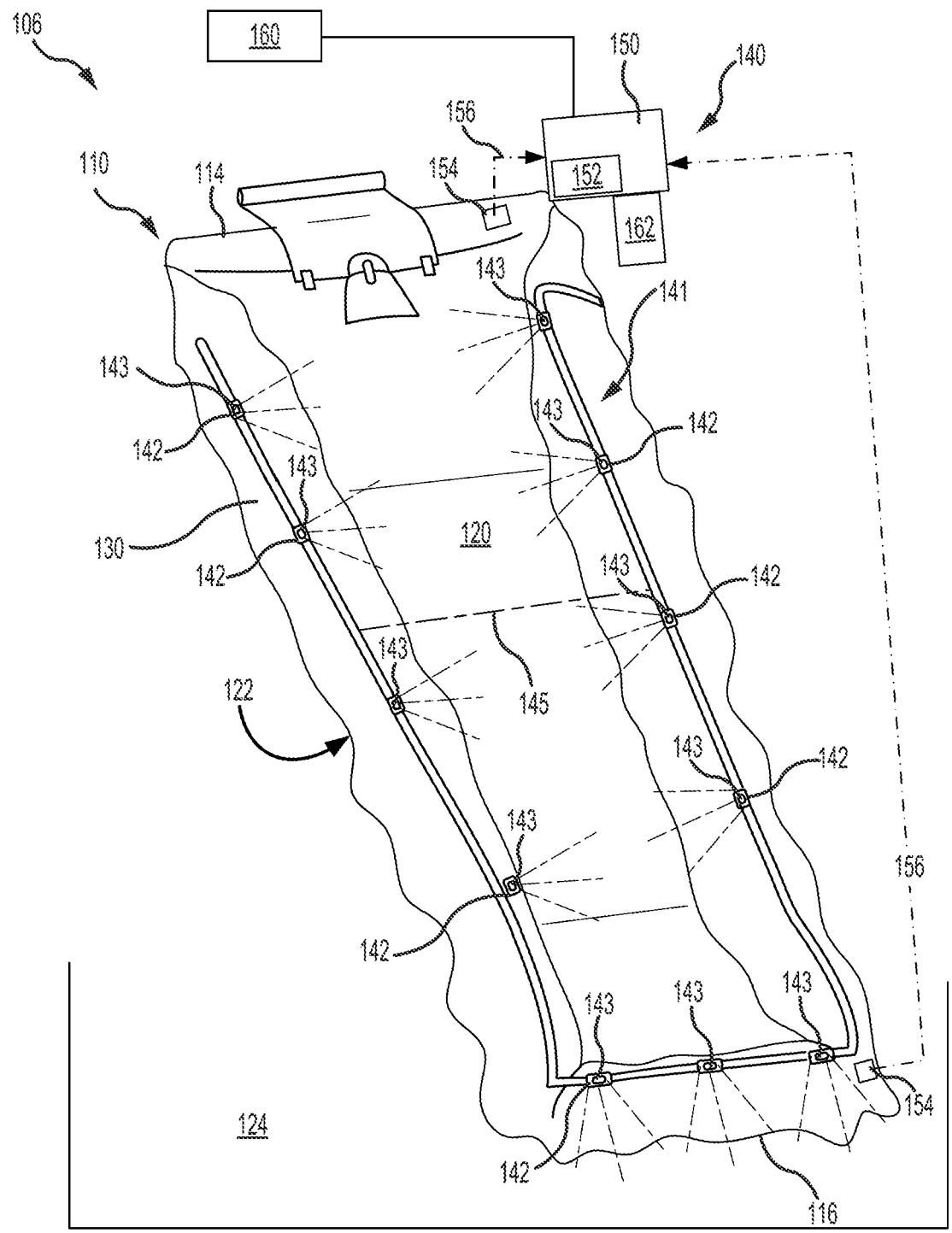
FIG. 2A illustrates an evacuation slide in a partially inflated state, in accordance with various embodiments.
Figure 2B:
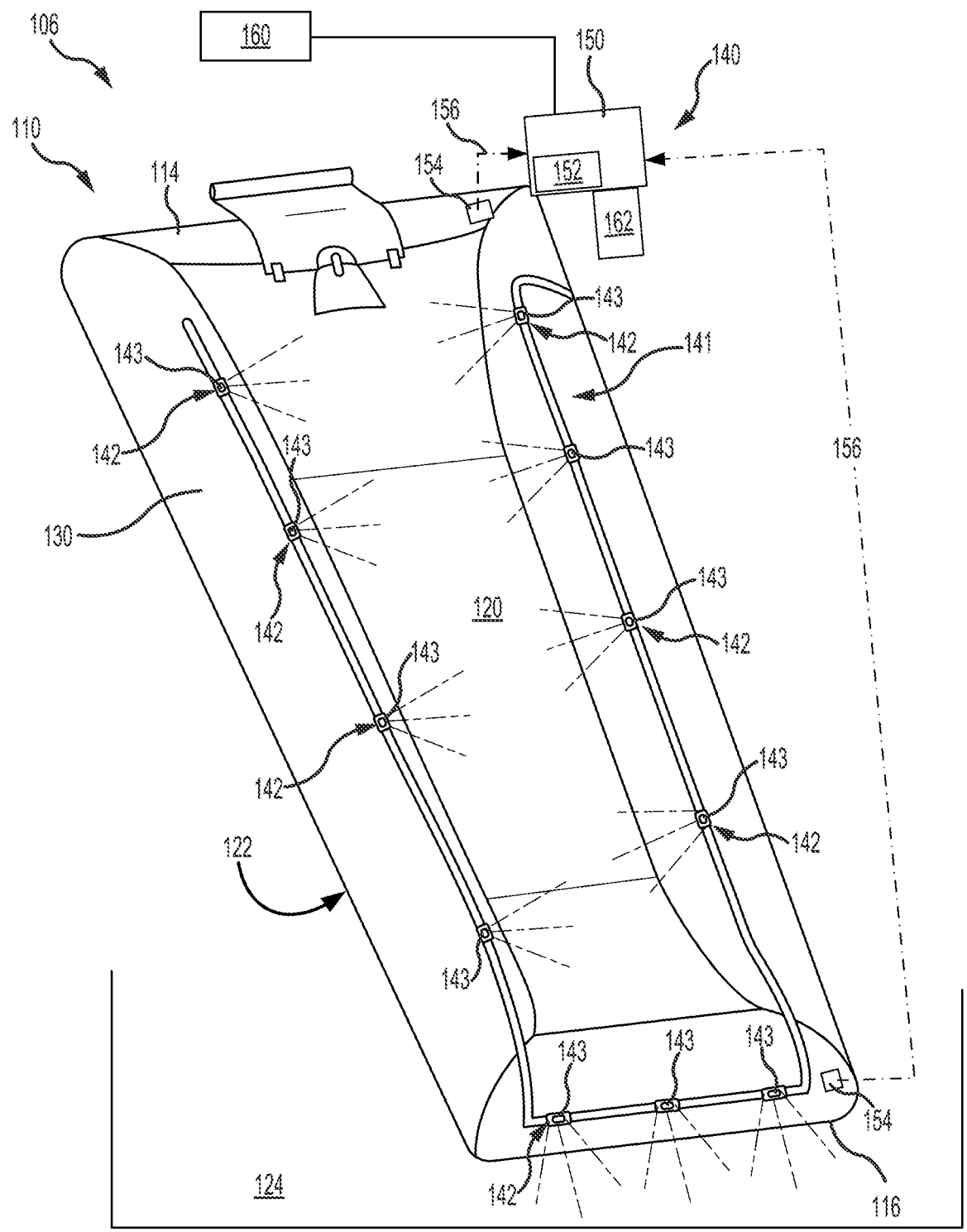
FIG. 2B illustrates an evacuation slide in a fully inflated state, in accordance with various embodiments.

With reference to FIGS. 2A and 2B, and continuing reference to FIG. 1, an inflatable evacuation slide 110 of evacuation assembly 106 is illustrated in a partially inflated state (also referred to as a partially deployed position) and a fully inflated state (also referred to as a fully deployed position), respectively. Evacuation slide 110 may deploy from aircraft 100 in response to the opening of exit door 104. In accordance with various embodiments, evacuation slide 110 includes a head end 114 and a toe end 116 opposite head end 114. Head end 114 may be coupled to an aircraft structure (e.g., fuselage 102 in FIG. 1). Evacuation slide 110 includes a sliding surface 120 and an underside surface 122 opposite sliding surface 120. Sliding surface 120 extends from head end 114 to toe end 116. Evacuation slide 110 includes an inflatable rail structure 130 extending between head end 114 and toe end 116 and which may define, at least, a portion of sliding surface 120. In response to an evacuation event (i.e., upon deployment of evacuation slide 110), underside surface 122 may be oriented toward an exit surface 124 (e.g., toward the ground or toward a body of water). While evacuation slide 110 is illustrated as a single lane slide, it is contemplated and understood that evacuation slide 110 may include any number of lanes. In various embodiments, evacuation slide 110 may be an off-wing evacuation slide and may include a ramp portion located over the wing of aircraft 100 (i.e., evacuation slide 110 may include a ramp portion extending over the wing and between head end 114 and exit door 104). In various embodiments, evacuation slide 110 may be employed solely as slide. In various embodiments, evacuation slide 110 may be employed as a slide and also as a raft in the invent of a water landing.

In accordance with various embodiments, evacuation slide 110 includes an evacuation slide light system 140. Evacuation slide light system 140 includes a light harness 141 having a plurality of lights 142 located thereon. Lights 142 may be located along inflatable rail structure 130. The lights 142 located longitudinally along inflatable rail structure 130 may be oriented toward sliding surface 120. The lights 142 located along toe end 116 may be oriented away from sliding surface 120 and toward exit surface 124. Lights 142 are configured to illuminate sliding surface 120 and to illuminate exit surface 124 proximate toe end 116. In an off-wing evacuation slide, lights 142 may also be located along the ramp portion.

In accordance with various embodiments, one or more of the light(s) 142 is also configured to indicate a readiness of evacuation slide 110. Stated differently, one or more of the light(s) 142 may include a multi-color light emitting diode (LED) 143, which may be employed to indicate an inflation state of evacuation slide 110. With momentary reference to FIG. 3, in various embodiments, multicolor LED 143 may comprise a red (R) LED 144, a green (G) LED 146, and a blue (B) LED 148.

Returning to FIGS. 2A and 2B, in various embodiments, multicolor LEDs 143 may be used to replace one or more single color LEDs in light harness 141. In this regard, evacuation slide light system 140 may be retrofit into current light harnesses. Stated differently, multicolor LEDs 143 for indicating slide readiness and for meeting slide illumination requirements/regulations may be used in light harnesses that were previously employed solely for slide illumination.

Figure 3:
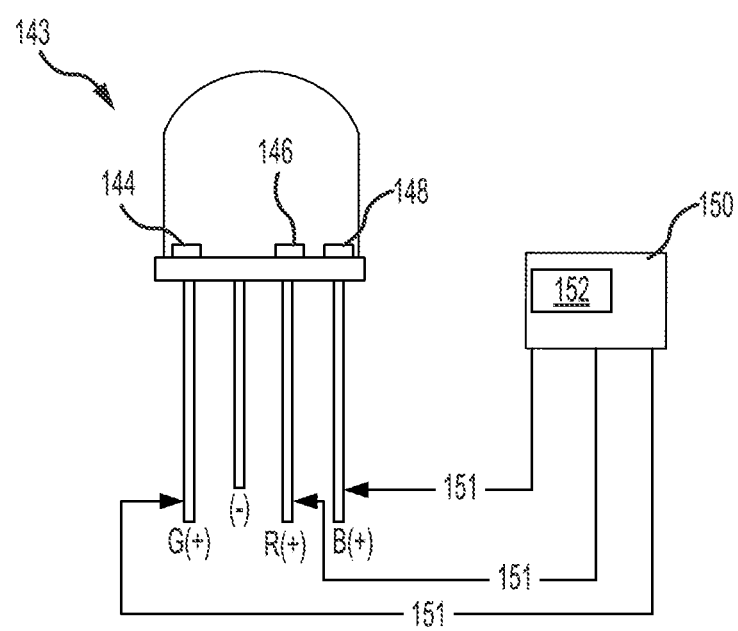
FIG. 3 illustrates a multicolor LED for an evacuation slide light system, in accordance with various embodiments.

With combined reference to FIG. 2A, FIG. 2B, and FIG. 3, evacuation slide light system 140 includes a controller 150 (shown schematically). Controller 150 is in operable communication with multicolor LEDs 143. In this regard, controller 150 is configured to control the color output by each multicolor LED 143 by controlling which of red LED 144, green LED 146, and blue LED 148 is illuminated. Stated differently, controller 150 sends commands 151 (e.g., power and/or current) to each of red LED 144, green LED 146, and blue LED 148. In various embodiments, controller 150 may be configured to provide different levels of current (e.g., a pulse width modulated (PWM) signal) to each of red LED 144, green LED 146, and blue LED 148, thereby allowing for multiple shades (or intensities) of a particular color. In various embodiments, controller 150 is configured to cause one or more of multicolor LEDs 143 to flash. Stated differently, commands 151 may switch red LED 144, green LED 146, and blue LED 148 between a powered on state and a powered off state at a desired interval.

Controller 150 may include one or more logic devices such as one or more of a central processing unit (CPU), an accelerated processing unit (APU), a digital signal processor (DSP), a field programmable gate array (FPGA), an application specific integrated circuit (ASIC), or the like (e.g., controller 150 may utilize one or more processors of any appropriate type/configuration, may utilize any appropriate processing architecture, or both). In various embodiments, controller 150 may further include a tangible, non-transitory computer-readable storage medium (or memory) 152 known in the art. Memory 152 may store instructions usable by the logic device(s) to perform operations and make determinations regarding the inflation state (e.g., pressure) of inflatable rail structure 130 and the current provided to multicolor LEDs 143. In this regard, the instructions may be for controlling evacuation slide light system 140. Any appropriate computer-readable type/configuration may be utilized as memory 152, any appropriate data storage architecture may be utilized by the memory 152, or both.

Controller 150 may begin illuminating lights 142 in response to evacuation slide 110 being deployed. For example, controller 150 may begin providing current to lights 142 in response to exit door 104 (FIG. 1) being opened. In various embodiments, controller 150 may begin providing current to lights 142 in response to depression of a button, actuation of a lever, or similar action. In various embodiments, controller 150 is configured to cause multicolor LEDs 143 to emit a first color in response to deployment of evacuation slide 110.

It may be desirable for evacuation slide 110 to have a sufficient rigidity or beam strength, when in the fully inflated state, for evacuees to jump onto the sliding surface 120 of evacuation slide 110 and slide down to exit surface 124 and/or to maintain buoyancy when employed as a life raft. In the fully inflated state, inflatable rail structure 130 may be inflated to at least a minimum pressure to provide sufficient beam strength to operate as a slide and/or to maintain buoyancy when operating as a life raft. For example, a pressure of 3.0 psi (20.7 kPA) may be a minimum pressure desired within inflatable rail structure 130.

In accordance with various embodiments, evacuation slide light system 140 includes one or more sensor(s) 154. Sensor(s) 154 is/are configured to monitor a pressure of inflatable rail structure 130 and/or a stretch of the material of inflatable rail structure 130. In this regard, sensor(s) 154 may include pressure sensor(s) and/or stretch sensor(s). For example, sensor 154 may include a piezoelectric sensor, a fiber bragg grating (FBG) sensor, a microelectromechanical system (MEMS) sensor, a pressure switch, or any other sensor capable of monitoring the pressure within inflatable rail structure 130 and/or the stretch of the material of inflatable rail structure 130.

The sensor(s) 154 are in operable communication (e.g., via a wired connection or a wireless connection) with controller 150. Sensor(s) 154 send signals 156 to controller 150. Sensor(s) 154 may begin sending signals 156 in response to deployment of evacuation slide 110. Signal 156 correlates to an inflation level and/or pressure of inflatable rail structure 130. In accordance with various embodiments, controller 150 is configured to control the color emitted by multicolor LEDs 143 based on the pressure of inflatable rail structure 130. Controller 150 determines the pressure of inflatable rail structure 130 based on signal 156.

In accordance with various embodiments, controller 150 is configured to compare the pressure of inflatable rail structure 130 to a beam (or first) threshold pressure (e.g., to the minimum pressure associated with sufficient beam strength for evacuation slide 110). If controller 150 determines that the pressure of inflatable rail structure 130 is less than the beam threshold pressure, controller 150 commands multicolor LEDs 143 to emit a first color (e.g., red). If controller 150 determines that the pressure of inflatable rail structure 130 is greater than or equal to the beam threshold pressure, controller 150 commands multicolor LEDs 143 to emit a second color (e.g., green or white). Stated differently, controller 150 is configured to send a first current configured to cause multicolor LEDs 143 to emit a first color when evacuation slide 110 is partially inflated and to send a second current configured to cause multicolor LEDs 143 to emit a second color when evacuation slide 110 is fully inflated. When multicolor LEDs 143 are emitting the first color (e.g., red) it indicates to evacuees and crew that the evacuation slide 110 in not fully inflated and is not safe to enter. When multicolor LEDs 143 are emitting the second color (e.g., green or white) and/or when the multicolor LEDs 143 change from the emitting first color to emitting the second color, it indicates to evacuees and/or crew that evacuation slide 110 is fully inflated and that it is safe to enter sliding surface 120.

In accordance with various embodiments, controller 150 is configured to monitor the pressure of evacuation slide 110 based on signals 156. If controller 150 determines the pressure of inflatable rail structure 130 has decreased to less than the beam threshold pressure (e.g., if inflatable rail structure 130 were to be punctured), controller 150 causes multicolor LEDs 143 to switch from emitting the second color (e.g., green or white) to emitting the first color (e.g., red), thereby indicating that evacuation slide 110 is not fully inflated. In this regard, controller 150 may cause lights 142 to go from indicating that the evacuation slide 110 is safe enter to indicating that the evacuation slide 110 is unsafe to enter, thereby allowing crew to divert evacuees to another evacuation slide.

In various embodiments, sensor(s) 154 may be located at a last area to inflate of inflatable rail structure 130. For example, in various embodiments, sensor(s) 154 may be located at toe end 116. In various embodiments, sensor(s) 154 may be located at head end 114 of evacuation slide 110 and controller 150 may be configured to monitor backpressure flow characteristics and make decisions regarding lights 142 based on deployment pressure information stored in memory 152. In this regard, sensor(s) 154 may be located at any suitable location along inflatable rail structure 130.

In various embodiments, controller 150 may be configured to neglect pressure spikes associated with the release/separation of evacuation slide restraints, which are configured to control the deployment and unfolding of the evacuation slide 110. In this regard, controller 150 may be configured to compare the slide pressure, determined from the signals 156 from sensors 154, to the beam threshold pressure after all of the restraints have released, thereby allowing controller 150 to make better and/or more accurate decisions regarding the color to be emitted by multicolor LEDs 143.

In various embodiments, controller 150 may be configured to adjust a flashing speed of multicolor LEDs 143 based on the pressure of inflatable rail structure 130 (i.e., based on the signals 156 received from sensors 154). For example, controller 150 may be configured to cause a flashing speed of multicolor LEDs 143 to decrease as the pressure of inflatable rail structure 130 increases. Stated differently, controller 150 may be configured to cause a duration of time between multicolor LEDs 143 being in the powered off state to increase as the pressure of inflatable rail structure 130 approaches the beam threshold pressure. Controller 150 may cause the multicolor LEDs 143 to stop flashing (e.g., be constantly powered on) in response to determining the pressure of evacuation slide 110 is greater than or equal to the beam threshold pressure. Similarly, controller 150 may cause a flashing speed of multicolor LEDs 143 to increase if the pressure of evacuation slide 110 begins to decrease (e.g., if a difference between the beam threshold pressure and the evacuation slide pressure is increasing).

Conveying the changing pressure of inflatable rail structure 130 via flashing multicolor LEDs 143 tends to allow evacuees to make more informed decisions and/or to better weigh the risks of entering the evacuation slide 110. For example, if the flashing speed is decreasing, it indicates that the evacuation slide 110 is nearing a safe pressure and, based on other dangers that may be present, it may be desirable to enter evacuation slide 110 before the beam threshold pressure is achieved. As another example, if the speed of flashing of lights 142 is not changing or is increasing, it indicates that evacuation slide 110 is not inflating properly and passengers should not continue waiting for the slide to inflate but should instead head towards a different exit.

In various embodiments, controller 150 may be configured to cause multicolor LEDs 143 to begin flashing if the pressure of evacuation slide 110 does not reach the beam threshold pressure within a particular duration of time. For example, in various embodiments, controller 150 may start a timer in response receiving an initial deployment signal, which is sent upon deployment of evacuation slide 110. In various embodiments, the initial deployment signal may be sent to controller 150 in response to exit door 104 being opened or in response to another action taken by a passenger or crew member, such as, for example, depression of a button, actuation of a lever, etc. In various embodiments, the initial deployment signal causes controller 150 to power on. In various embodiments, controller 150 commands multicolor LEDs 143 to emit the first color in response to receiving the initial deployment signal. In various embodiments, at a preset duration of time after receiving the initial deployment signal (e.g., after 4 seconds, after 5 seconds, 6 seconds, or any other desired duration) controller 150 may determine if the pressure of evacuation slide 110 is greater than the beam threshold pressure. If after the preset duration of time, the pressure of evacuation slide 110 is less than the beam threshold pressure, controller 150 may command multicolor LEDs 143 to begin flashing, thereby indicating to evacuees and crew that evacuation slide 110 is not inflating properly and that passengers should not continue waiting for the slide to inflate but should instead head towards a different exit.

In various embodiments, the flashing rate of multicolor LEDs 143 and/or of single color LEDs 172 can also correspond to the inflation level of evacuation slide 110, such that the flashing rate may indicate when evacuation slide 110 is 50 percent inflated, 70 percent inflated, 90 percent inflated, etc. Configuring the flashing rate to indicate an inflation level may be useful during production testing or other operations where the pressure of the slide is checked, such as during qualification and development tests.

In various embodiments, controller 150 and/or lights 142 may receive power from an aircraft power supply 160. In various embodiments, controller 150 may be mounted proximate head end 114. Locating controller 150 proximate head end 114 may allow for relatively easy connection to aircraft power supply 160. In various embodiments, controller 150 and/or lights 142 may receive power from a dedicated, stand-alone battery 162. In other words, battery 162 may only provide power to controller 150 and lights 142. Battery 162 may provide redundancy should aircraft power supply 160 be unavailable.

Figure 4:
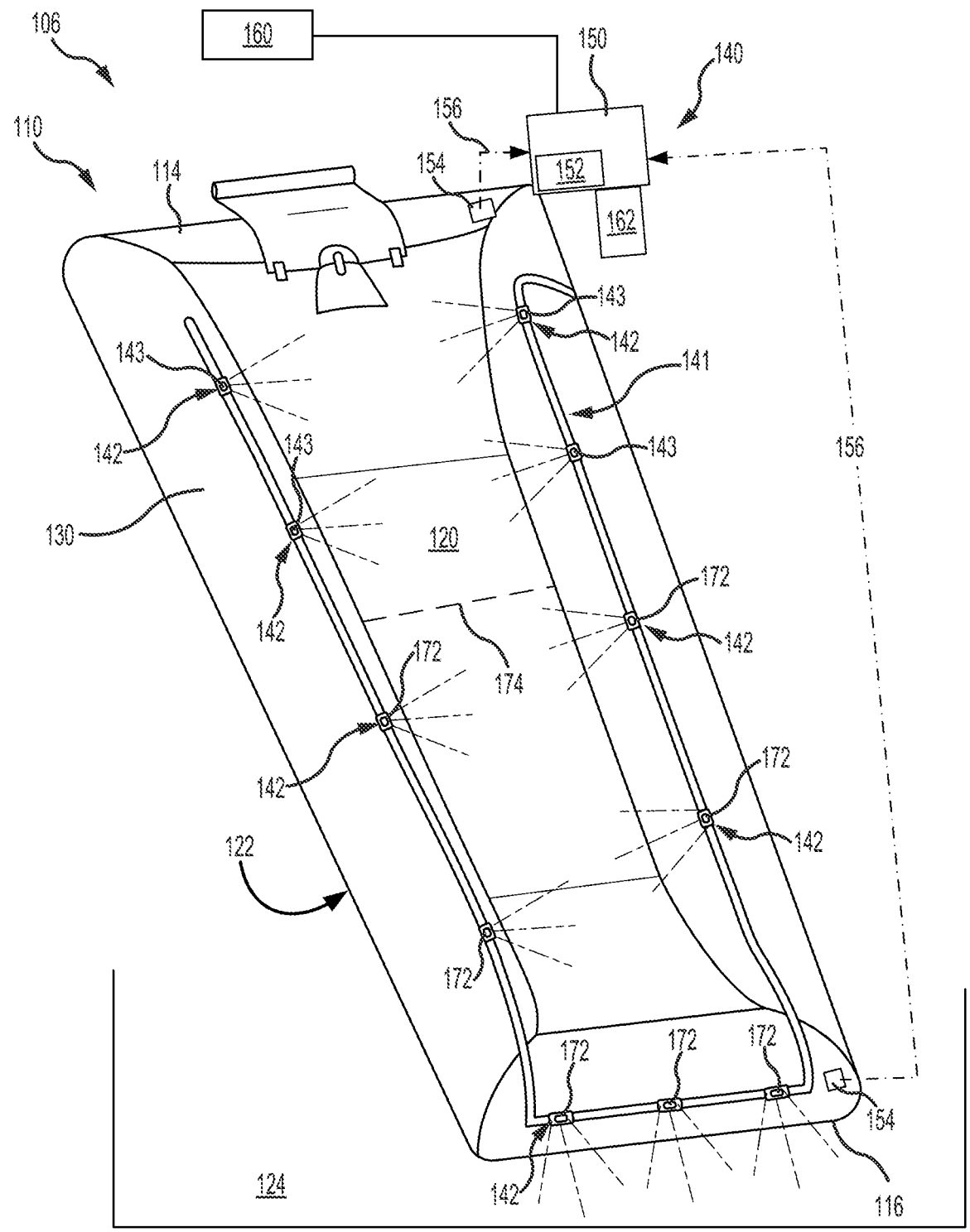
FIG. 4 illustrates an evacuation slide in a fully inflated state and having multicolor LEDs proximate a head end of the evacuation slide, in accordance with various embodiments.

In various embodiments, all of lights 142 may comprise multicolor LEDs 143. With reference to FIG. 4, in various embodiment, only select lights 142 may comprise multicolor LEDs 143. In this regard, a first group of the lights 142 on light harness 141 may include multicolor LEDs 143 and a second group of the lights on light harness 141 may include single color LEDs 172. Single color LEDs 172 are configured to emit one color (e.g., green or white). In various embodiments, single color LEDs 172 may emit the second color (i.e., the color emitted by multicolor LEDs 143 when the pressure of evacuation slide 110 is greater than the beam threshold pressure).

The lights 142 selected for multicolor LEDs 143 may be lights 142 that are readily visible to evacuees and/or crew located at exit door 104 and/or in aircraft 100. For example, in various embodiments, multicolor LEDs 143 may be employed proximate head end 114 and single color LEDs 172 may be employed proximate toe end 116. Stated differently, multicolor LEDs 143 may be located between head end 114 and a slide midpoint 174 located halfway between head end 114 and toe end 116, and single color LEDs 172 may be located between toe end 116 and the slide midpoint 174.

Figure 5:
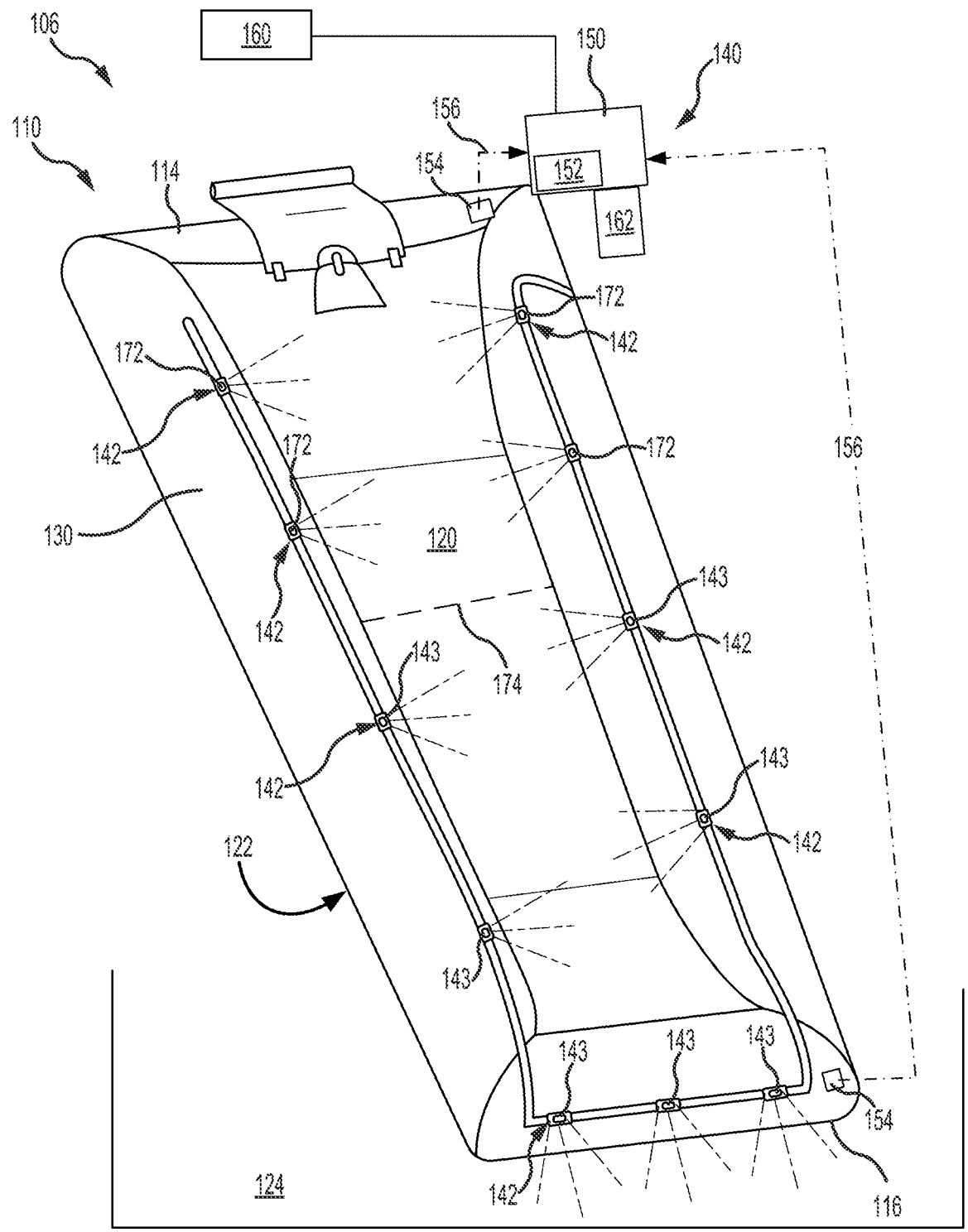
FIG. 5 illustrates an evacuation slide in a fully inflated state and having multicolor LEDs proximate a toe end of the evacuation slide, in accordance with various embodiments.

With reference to FIG. 5, in various embodiments, multicolor LEDs 143 may be employed proximate toe end 116 and single color LEDs 172 may be employed proximate head end 114. Stated differently, multicolor LEDs 143 may be located between toe end 116 and the slide midpoint 174 and single color LEDs 172 may be used between head end 114 and the slide midpoint 174.

Figure 6:
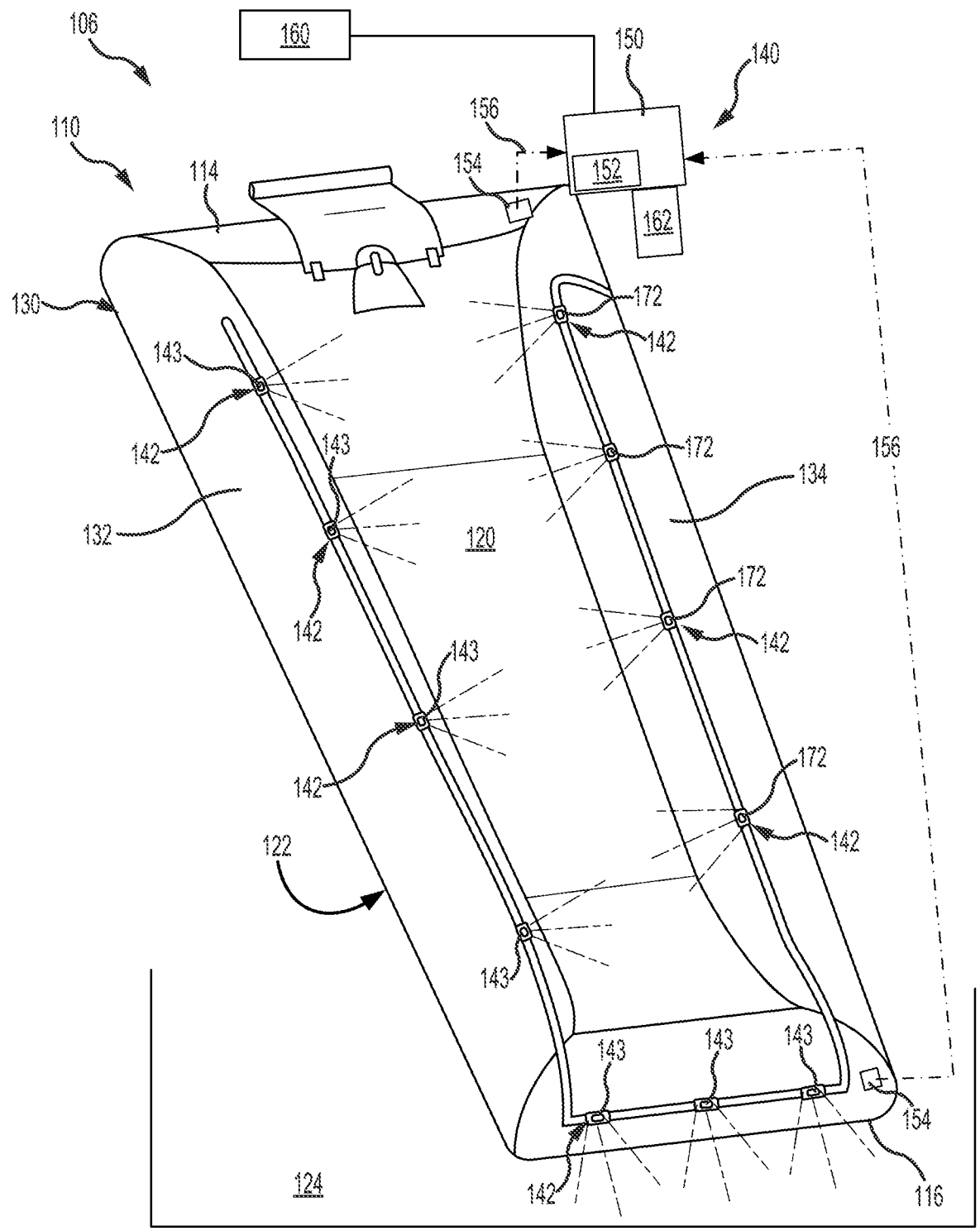
FIG. 6 illustrates an evacuation slide in a fully inflated state and having multicolor LEDs along a first siderail of the evacuation slide, in accordance with various embodiments.

With reference to FIG. 6, in various embodiments, multicolor LEDs 143 may be located along a first siderail 132 of inflatable rail structure 130 and single color LEDs 172 may be located along a second siderail 134 of inflatable rail structure 130. It should be appreciated that the configurations of multicolor LEDs 143 and single color LEDs 172 described in FIGS. 4, 5, and 6 are provided merely as examples and other configurations of multicolor LEDs 143 and single color LED 172 are contemplated and within the scope of the present disclosure.

Figure 7:
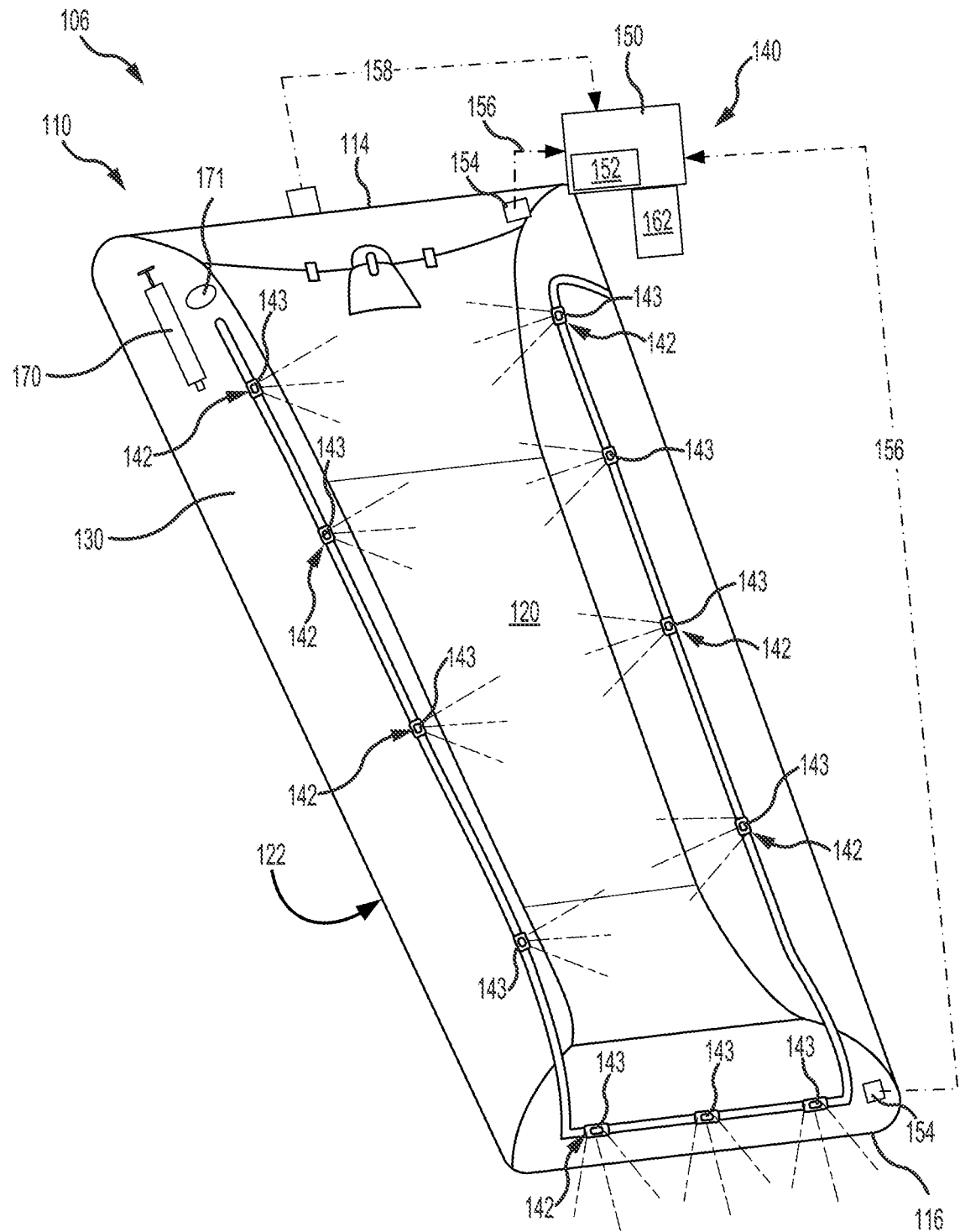
FIG. 7 illustrates an evacuation slide in a raft mode, in accordance with various embodiments.

With reference to FIG. 7, in various embodiments, evacuation slide light system 140 may also be employed to monitor an inflation state of rail structure 130, when evacuation slide 110 is employed as a life raft. For example, if evacuation slide 110 is configured to be employed as a life raft, evacuation assembly 106 will generally include a manual air pump 170. Air pump 170 may be used by evacuees (i.e., occupants of the life raft) to inflate/add air to the rail structure 130. Controller 150 may be configured to compare the pressure of evacuation slide 110, which is determined from the signals 156 received from sensors 154, to a raft (or second) threshold pressure. The raft threshold pressure may be a pressure associated with maintaining a minimum buoyancy of rail structure 130. The raft threshold pressure may be equal to the beam threshold pressure or may be different from the beam threshold pressure. Controller 150 may be configured to cause multicolor LEDs 143 to flash in response to determining the pressure of rail structure 130 has fallen below the raft threshold pressure, thereby indicating to occupants of the life raft to begin using the air pump 170 to inflate rail structure 130. In various embodiments, the flashing multicolor LEDs 143 may be located proximate an inflate/deflate valve 171 of the evacuation slide 110. Controller 150 may command multicolor LEDs 143 to stop flashing in response to receiving a signal 156 indicating that the pressure of rail structure 130 is greater than the raft threshold pressure, thereby indicating to an operator of air pump 170 that rail structure 130 is sufficiently inflated and that he/she may stop pumping air into rail structure 130.

In various embodiments, controller 150 may be configured to determine whether to flash multicolored LEDs 143 based on a comparison of the evacuation slide pressure to the beam threshold pressure. In various embodiments, controller 150 may be configured to determine a difference between the beam threshold pressure and the evacuation slide pressure. Controller 150 may compare the difference between the beam threshold pressure and the evacuation slide pressure to a threshold difference. Controller 150 may cause multicolor LEDs 143 to flash in response to determining the difference between the beam threshold pressure and the evacuation slide pressure is greater than the threshold difference, thereby indicating to occupants of the life raft to begin using the manual air pump 170 to inflate rail structure 130. Controller 150 may command multicolor LEDs 143 to stop flashing in response to determining the difference between the beam threshold pressure and the evacuation slide pressure is less than the threshold difference, thereby indicating to operator of the air pump 170 that rail structure 130 is sufficiently inflated and that he/she may stop pumping air into rail structure 130.

In various embodiments, controller 150 is configured to begin comparing the pressure of evacuation slide 110 to the raft threshold pressure and/or begin determining the difference between the beam threshold pressure and the evacuation slide pressure, in response to determining evacuation slide 110 has separated from aircraft 100. For example, controller 150 may receive a separation signal 158 in response evacuation slide 110 separating from aircraft 100. Separation signal 158 may be an electrical signal sent from, for example, a position sensor, or may be a mechanical signal triggered by, for example, a lanyard or other mechanical linkage separating in response to evacuation slide 110 translating away from aircraft 100.

Figure 8A:
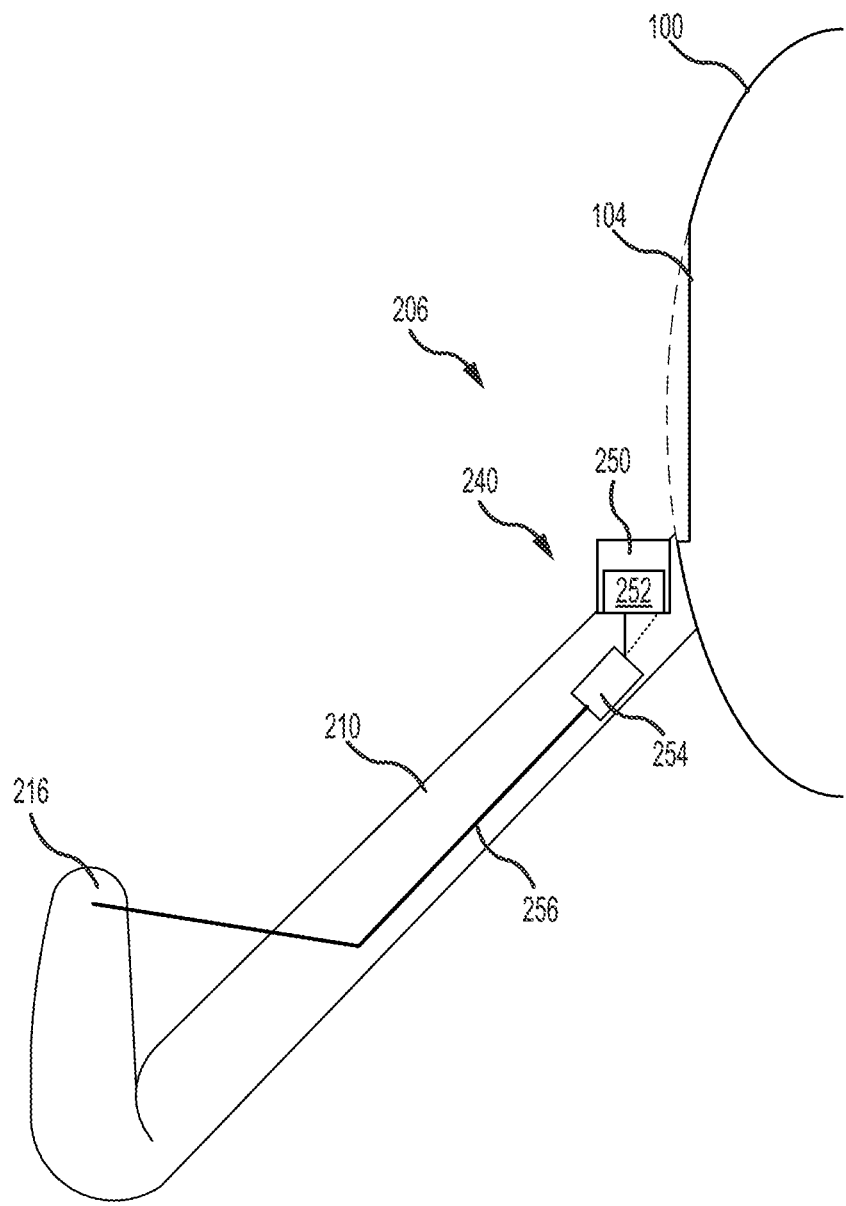
FIGS. 8A and 8B illustrate an evacuation slide in a partially inflated state and a fully inflated state, respectively, in accordance with various embodiments.
Figure 8B:
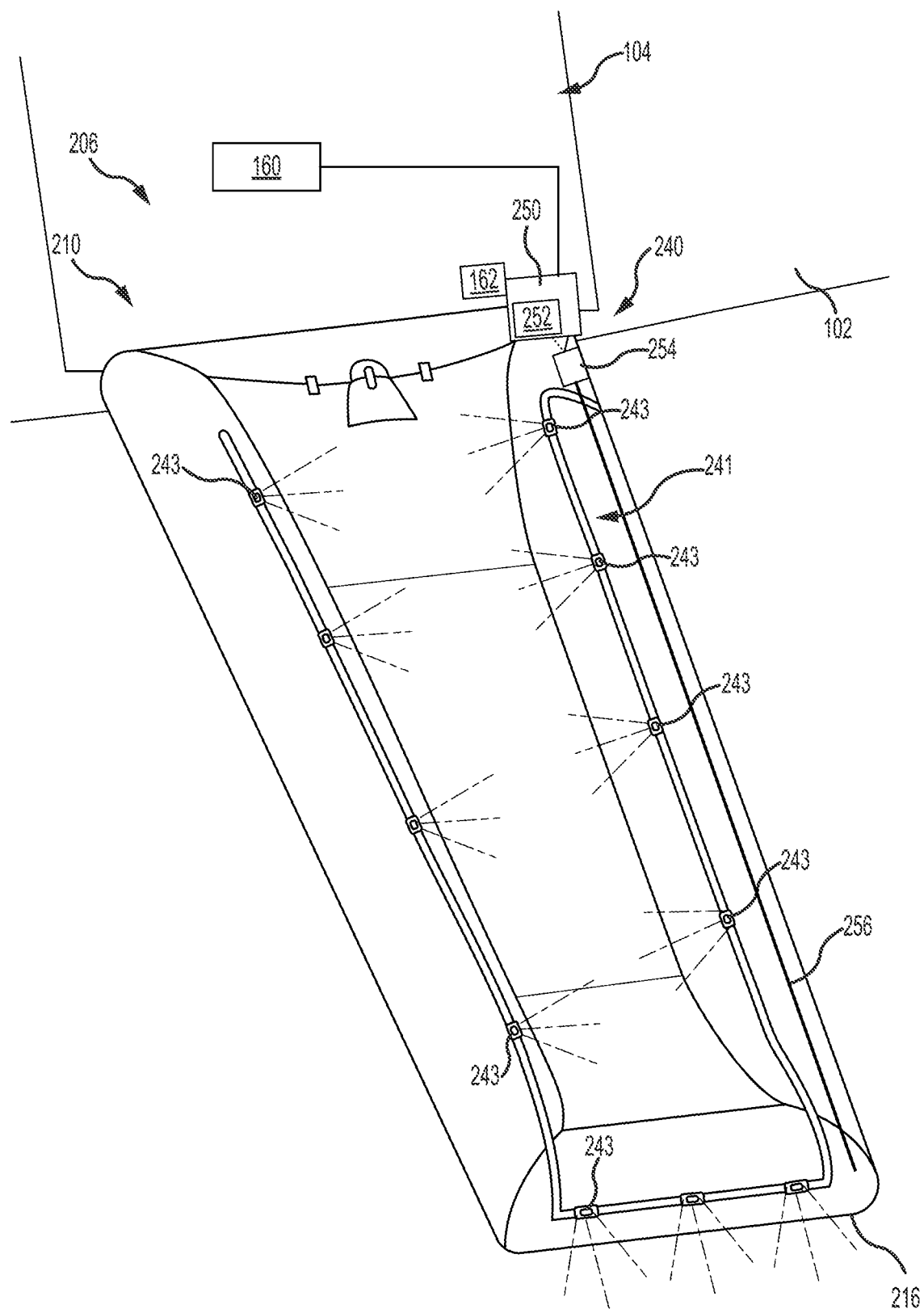

With reference to FIGS. 8A and 8B, an evacuation assembly 206 is illustrated with an evacuation slide 210 of the evacuation assembly 206 in a folded position (also referred to as a partially deployed position) and in a fully deployed position, respectfully. In various embodiments, aircraft 100 may include evacuation assembly 206 in place of evacuation assembly 106, with momentary reference to FIG. 1. Evacuation slide 210 is configured to deploy from exit door 104.

In accordance with various embodiments, evacuation slide 210 includes an evacuation slide light system 240. Evacuation slide light system 240 includes a light harness 241 having one or more multicolor LEDs 243, similar to multicolor LEDs 143 in FIG. 3. In various embodiments, light harness 241 may also include single color LEDs, similar to single color LEDs in FIGS. 4, 5, and 6.

Evacuation slide light system 240 includes a controller 250 and a memory, similar to controller 150 and memory 152, respectively, in FIG. 2A. Controller 250 is operably coupled to multicolor LEDs 243. Controller 250 is configured to command multicolor LEDs 243 to emit a first color upon deployment of evacuation slide 210. In this regard, the controller 250 may receive an initial deployment signal in response to evacuation slide 210 deploying (e.g., in response to exit door 104 being opened, in response to depression of a button, in response to actuation of a lever, etc.). In response to receiving the initial deployment signal, controller 250 may command multicolor LEDs 243 to emit a first color (e.g., red).

A switch 254 may be in operable communication with controller 250. Switch 254 may be configured to translate between a first state (or position) and a second state (or position). Controller 250 may be configured to determine whether switch 254 is in the first state or the second state.

A lanyard 256 may be coupled between switch 254 and evacuation slide 210. In various embodiments, lanyard 254 may be coupled between switch 254 and a toe end 216 of evacuation slide 210. In accordance with various embodiments, lanyard 256 is configured to translate switch 254 from the first state (FIG. 8A) to the second state (FIG. 8B) in response to evacuation slide 210 fully deploying. Stated differently, lanyard 256 is coupled to evacuation slide 210 such that lanyard 256 will translate switch 254 from the first state to the second state in response to pressure of evacuation slide 210 equaling and/or exceeding the beam threshold pressure. In accordance with various embodiments, the translation of switch 254 from the first state to the second state causes controller 250 command multicolor LEDs 243 to emit the second color (e.g., green or white), thereby indicating to evacuees and crew that evacuation slide 210 is safe enter.

Figure 9A:
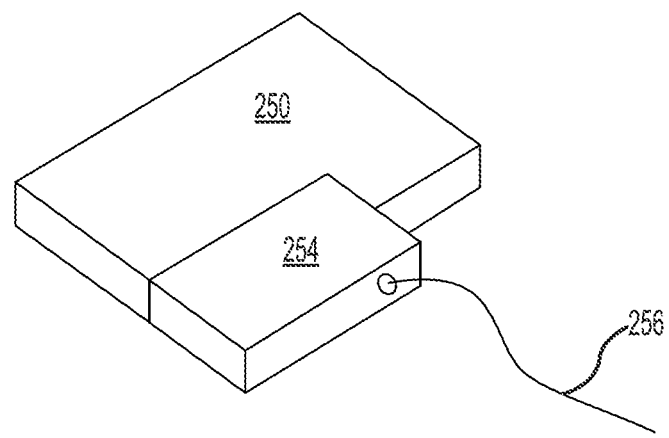
FIGS. 9A and 9B illustrate a lanyard coupled to a switch of an evacuation slide light system and separated from the switch of the evacuation slide light system, respectively, in accordance with various embodiments.
Figure 9B:
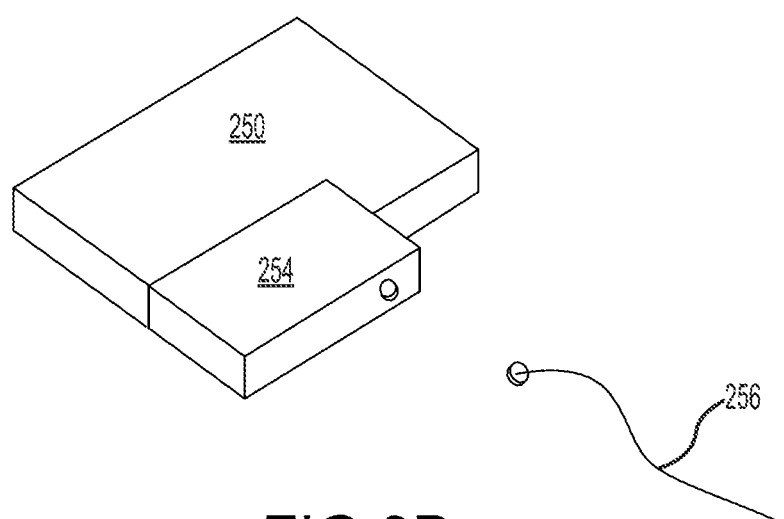

With reference to FIGS. 9A and 9B, in various embodiments, lanyard 256 may be configured to separate from switch 254 in response to evacuation slide 210 fully deploying. In FIG. 9A, lanyard 256 is attached to switch 254 (e.g., switch 254 is in the first state). Lanyard 256 may be attached to switch 254 prior to evacuation slide 210 fully deploying (e.g., prior to the pressure of evacuation slide 210 equaling and/or exceeding the beam threshold pressure). In accordance with various embodiments, lanyard 256 separates from switch 254, as shown in FIG. 9B, in response to the pressure of evacuation slide 210 equaling and/or exceeding the beam threshold pressure. Controller 250 is operably coupled to switch 254 and is configured determine if lanyard 256 is attached to or separated from switch 254. In various embodiments, switch 254 may send a signal to controller 250, in response to lanyard 256 separating from switch 254. In accordance with various embodiments, controller 250 is configured to command multicolor LEDs 243 to emit the second color (e.g., green or white) in response to determining lanyard 256 has separated from switch 254, thereby indicating to evacuees and crew that evacuation slide 210 is safe enter.

Figure 10A:
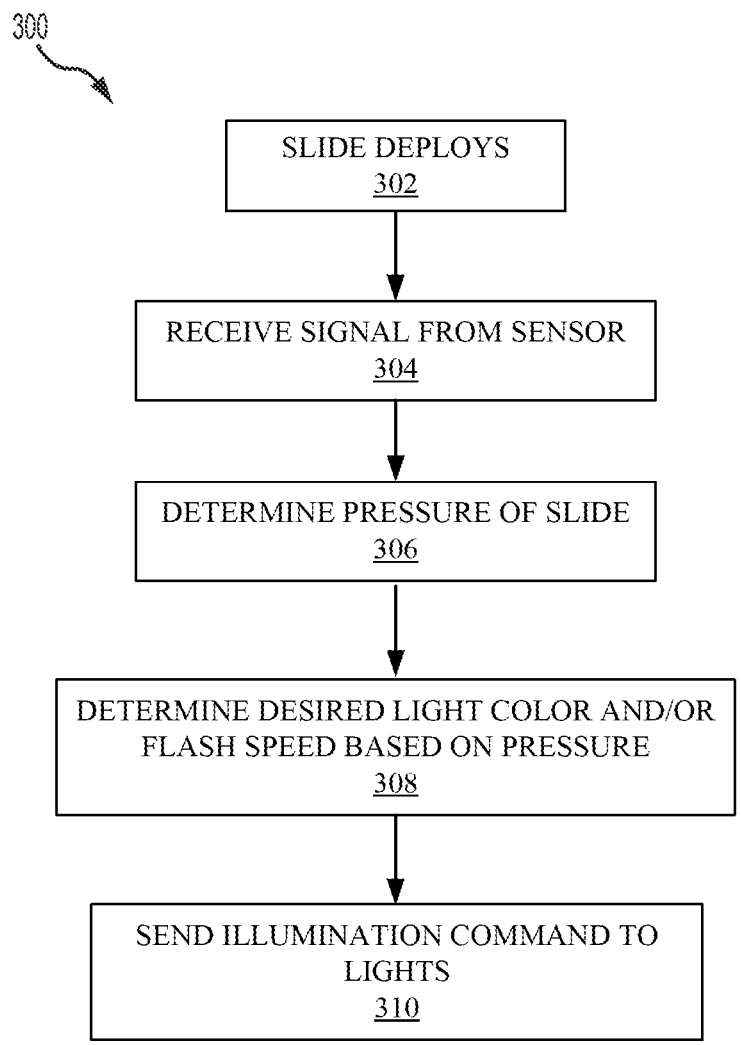
FIGS. 10A and 10B illustrate a process for operating an evacuation slide light system, in accordance with various embodiments.

With reference to FIG. 10A, a process 300 for controlling an evacuation slide system light system is illustrated. With combined reference to FIG. 10 and FIGS. 2A and 2B, process 300 may be performed by controller 150 to control evacuation slide light system 140. In accordance with various embodiments, process 300 may begin in response to deployment of evacuation slide 110 (step 302). In response to deployment of evacuation slide 110, controller 150 may begin receiving signal 156 from sensor 154 (step 304). Controller 150 may determine a pressure of the evacuation slide 110 (e.g., of inflatable rail structure 130) based on signal 156 from sensor 154 (step 306). Controller 150 may determine a desired illumination color for a plurality of lights (e.g., multicolor LEDs 143) based on the pressure of evacuation slide 110 (step 308). Controller 150 may send illumination command 151 (FIG. 3) to the plurality of lights (step 310). The illumination command is configured to cause the plurality of lights to emit the desired illumination color. In various embodiments, In various embodiments, step 308 may include controller 150 determining a desired flash speed for the plurality of lights based on the pressure signal, and step 310 may include controller 150 sending commands 151 (FIG. 3) to the plurality of lights to adjust the flashing speed of the plurality of lights.

In various embodiments, controller 150 may be configured to command the plurality of lights to emit a first color immediately upon deployment of the evacuation slide 110. For example, and with reference to FIG. 10B, in various embodiments, step 302 may include controller 150 receiving an initial deployment signal (step 302A), and in response to receiving the initial deployment signal, controller 150 may command the plurality of lights (e.g., multicolor LEDs 143) to emit a first color (step 302B).

In various embodiments, step 308 may include comparing the pressure of the evacuation slide 110 to a threshold pressure (step 308A). In various embodiments, the illumination command is configured to cause the plurality of lights to emit the first color if the pressure of the evacuation slide is less than the threshold pressure, and to cause the plurality of lights to emit a second color if the pressure of the evacuation slide is greater than or equal than the threshold pressure.

Figure 10B:
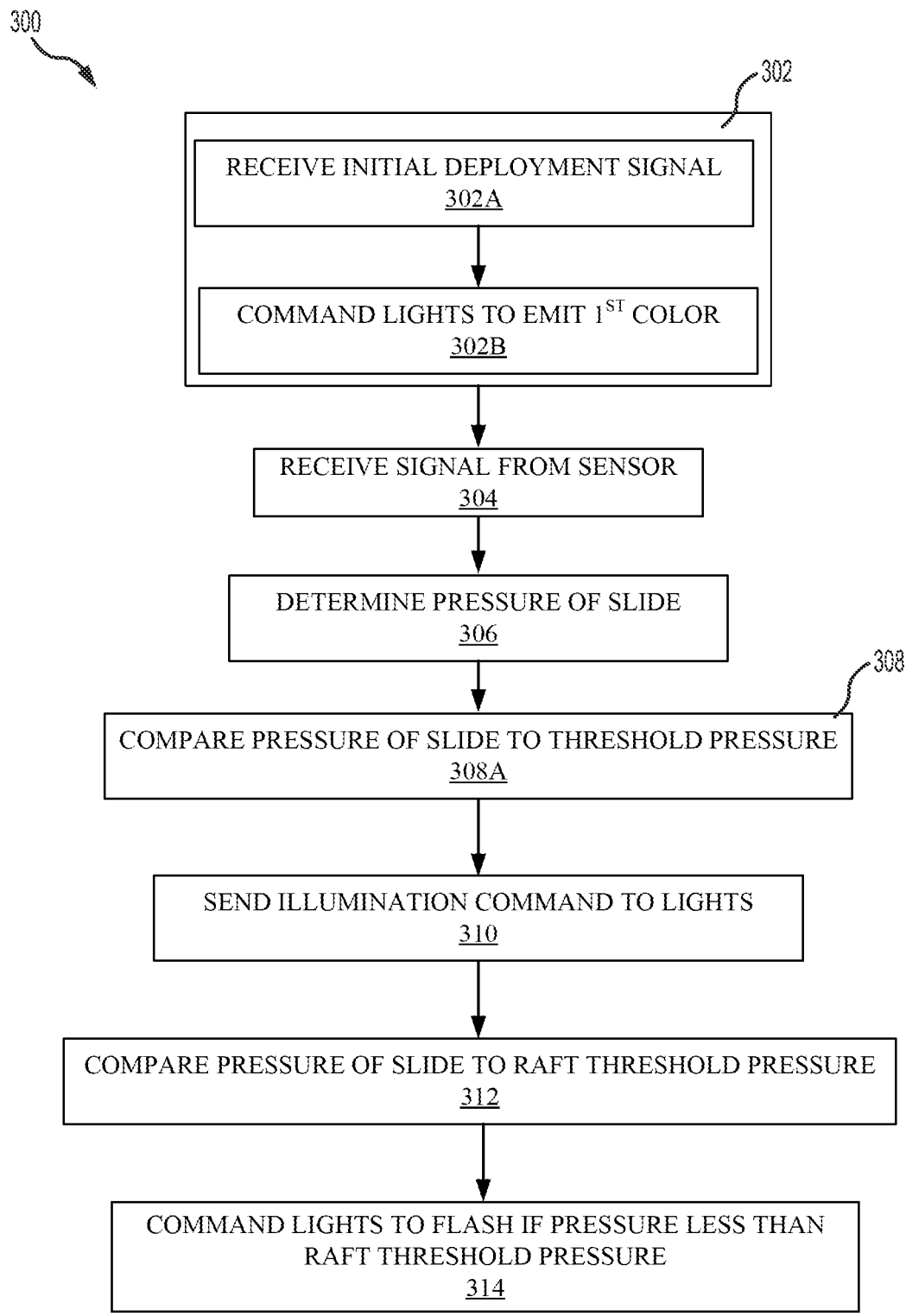

With continued reference to FIG. 10B, in various embodiments, process 300 may further include controller 150 comparing the pressure of the evacuation slide 110 to a raft threshold pressure (step 312). Controller 150 may command the plurality of lights to flash if the pressure of the evacuation slide is less than the raft threshold pressure (step 314). In various embodiments, step 312 may be performed in response to controller 150 determining the evacuation slide has separated from the aircraft. For example, controller 150 may compare the pressure of the evacuation slide 110 to the raft threshold pressure in response to receiving separation signal 158 in FIG. 7.

In various embodiments, process 300 may include controller 150 determining whether the pressure of the evacuation slide is equal to or greater than the threshold pressure at a preselected duration of time after receiving of the initial deployment signal (e.g., a preselected time after step 302A). Controller 150 may command the plurality of lights to flash if at the preselected duration after receiving of the initial deployment signal the pressure of the evacuation slide is less than the threshold pressure.

Process 300 and evacuation slide light systems 140, 240 are configured to indicate a deployment status of the evacuation slide 110,210 (i.e., whether evacuation slide 110, 210 is inflated sufficiently to safely evacuate passengers). Employing the evacuation slide's light system to indicate the slide's inflation status allows for a readiness indicator that is generally not affected by wind conditions and/or human factors and does not add additional components and/or weight to the evacuation assembly. Evacuation light systems 140, 240 can also inform first responders and/or ground personnel about the evacuation slide's deployment failure and/or malfunction. For example, ground personnel wanting to use the evacuation slide as a reentry device to the aircraft can determine the health and readiness of deployed evacuation slide for use as a reentry device based on the illumination color and/or flashing status of lights 142.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in *In re Nuijten* to fall outside the scope of patentable subject matter under 35 U.S.C. § 101.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An evacuation slide, comprising:
   an inflatable rail structure; and
   an evacuation slide light system coupled to the inflatable rail structure, the evacuation slide light system including:
      a switch;
      a lanyard coupled to the inflatable rail structure and configured to translate the switch between a first state and a second state, wherein in the first state the lanyard is coupled to the switch and wherein in the second state the lanyard is separated from the switch;
      a controller operably coupled to the switch; and
      a plurality of lights operably coupled to the controller, wherein the controller is configured to determine whether the switch is in the first state or the second state, wherein the controller is configured to cause the plurality of lights to emit a first color in response to determining the switch is in the first state, wherein the controller is configured to cause the plurality of lights to emit a second color in response to determining the switch is in the second state, wherein the controller is configured to receive an initial deployment signal in response to the evacuation slide being deployed, and wherein the controller is configured to cause the plurality of lights to begin flashing if the switch does not translate to the second state by the lanyard separating from the switch within a threshold duration of time after receipt of the initial deployment signal.

2. The evacuation slide of claim 1, wherein the lanyard is coupled to a toe end of the evacuation slide.

3. The evacuation slide of claim 1, wherein upon receiving the initial deployment signal the controller causes the plurality of lights to emit the first color.

4. The evacuation slide of claim 1, wherein the controller is configured to receive power from an aircraft power supply.

5. An evacuation slide light system, comprising:
   a switch;
   a lanyard coupled to the inflatable rail structure and configured to translate the switch between a first state and a second state, wherein in the first state the lanyard is coupled to the switch and wherein in the second state the lanyard is separated from the switch;
   a controller operably coupled to the switch; and
   a plurality of lights operably coupled to the controller, wherein the controller is configured to determine whether the switch is in the first state or the second state, wherein the controller is configured to cause the plurality of lights to emit a first color in response to determining the switch is in the first state, wherein the controller is configured to cause the plurality of lights to emit a second color in response to determining the switch is in the second state, wherein the controller is configured to receive an initial deployment signal in response to the evacuation slide being deployed, and wherein the controller is configured to cause the plurality of lights to begin flashing if the switch does not translate to the second state by the lanyard separating from the switch within a threshold duration of time after receipt of the initial deployment signal.

6. The evacuation slide light system of claim 5, wherein the lanyard is coupled to a toe end of the evacuation slide.

7. The evacuation slide light system of claim 5, wherein upon receiving the initial deployment signal the controller causes the plurality of lights to emit the first color.

8. The evacuation slide light system of claim 5, wherein the controller is configured to receive power from an aircraft power supply.

* * * * *